United States Patent [19]

Hori et al.

[11] Patent Number: 5,288,156
[45] Date of Patent: Feb. 22, 1994

[54] APPARATUS FOR GENERATING CHARACTER PATTERN FOR SERIAL PRINTER

[75] Inventors: Takashi Hori; Nobuhisa Takabayashi, both of Nagano, Japan

[73] Assignee: Seiko Epson Corporation, Tokyo, Japan

[21] Appl. No.: 974,487

[22] Filed: Nov. 12, 1992

[30] Foreign Application Priority Data

Nov. 15, 1991 [JP] Japan .................. 3-327129

[51] Int. Cl.$^5$ .............................. B41J 2/00
[52] U.S. Cl. .................... 400/121; 395/102
[58] Field of Search ............ 400/121; 395/102, 110; 340/731, 739

[56] References Cited

U.S. PATENT DOCUMENTS 5,018,883  5/1991  Fujita ................... 400/121

FOREIGN PATENT DOCUMENTS 0327002  1/1988  European Pat. Off. ......... 400/121
0392655  3/1989  European Pat. Off. ......... 400/121

Primary Examiner—David A. Wiecking
Assistant Examiner—Steven S. Kelley
Attorney, Agent, or Firm—Sughrue, Mion, Zinn, Macpeak & Seas

[57] ABSTRACT

A character pattern generation apparatus for a serial printer, comprises an input buffer for storing a character code and attribute data; contour data storing means for storing contour data representing a contour of a pattern correspondingly to the character code, the contour data including starting point coordinate data, end point coordinate data, and line type data; means for reading the contour data from the contour data storing means according to the character code stored in the input buffer; operation means for calculating new starting point coordinate data and new end point coordinate data, according to the degree of magnification which is designated by the attribute data, the starting point coordinate data and the end point coordinate data, to output coordinates of a starting point and coordinates of an end point, the starting point and end point being in a current pass area; contour reproducing means for joining the coordinates of the starting point with the coordinates of the end point output from the operation means by a line the type of which is designated by the line type data, to reproduce punctual coordinates of a contour; and means for converting the punctual coordinates of the contour from the contour reproducing means into bit data to output the converted bit data.

4 Claims, 4 Drawing Sheets

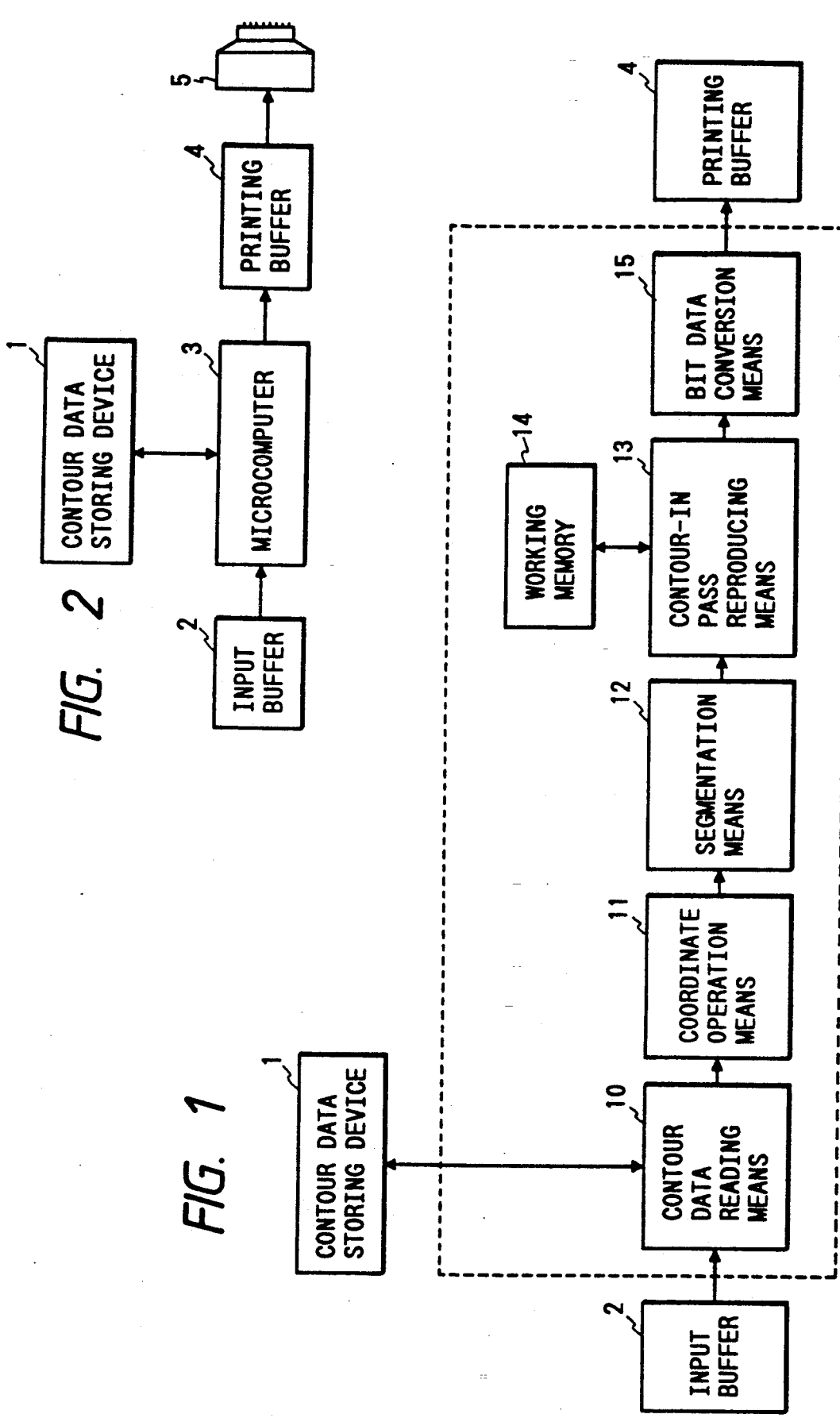

APPARATUS FOR GENERATING CHARACTER PATTERN FOR SERIAL PRINTER

BACKGROUND OF THE INVENTION

1. Field of the Invention

The present invention relates to a character pattern generation apparatus for producing dots based on outline data indicative of a contour of a character or a figure, and more particularly to a character pattern generation apparatus suitably used for a serial printer which prints a piece of outline data by a plurality of printing passes.

2. Prior Art

An outline font has various advantages in that, since a character or a pattern to be printed is stored in the form of its contour data, the amount of memory capacity can be reduced to store the data as compared with bit map data representing a character or a pattern by dots, and in that the quality of a printed character is not deteriorated even when the size of the character is reduced or magnified.

When a serial printer prints a pattern which is spread over an area greater than a width of a printing pass, the serial printer performs a plurality of printing passes to complete the printing of the pattern while feeding a sheet in such a manner that the interline space is zero.

When a figure which is indicated by an outline font is printed by the above-mentioned printing method, coordinates of reference points constituting the outline font are converted into coordinate values in accordance with a degree of magnification which is designated by attribute data. The coordinate values are converted into bit map data. Then, only bit data which correspond to a first printing pass are extracted, and the printing is performed for the first printing pass. Then, bit map data in accordance with the degree of magnification are generated from the same outline data in the same manner as described above, and only bit data corresponding to a second printing pass are extracted, and then the printing for the second printing pass is performed. The above process is sequentially repeated.

As described above, bit map data in accordance with a degree of magnification designated by attribute data are generated for each printing pass. Then, only the part of bit data which corresponds to the current printing pass is segmented. Therefore, the operation of converting the outline font data into bit data is required even for a portion not related to the printing, with the result that it takes a prolonged period of time to output bit map data. Moreover, in order to store bit data for all the area of the magnified character, a memory having a large capacity is required.

SUMMARY OF THE INVENTION

The present invention has been conducted in view of the above-mentioned problems, and an object of the invention is to provide a bit map data generation apparatus for a serial printer in which a developing time can be shortened and the capacity of a working memory can be reduced.

In order to solve the above-mentioned problems, a character pattern generation apparatus for a serial printer according to the invention comprises: contour data storing means for storing contour data representing a contour of a pattern correspondingly to a character code, said contour data including starting point coordinate data, end point coordinate data, and line type data which designates a type of a line joining coordinates indicated by said coordinate data with each other; means for reading said contour data based on said character code stored in an input buffer; operation means for calculating starting point coordinate data and end point coordinate data, based on a degree of magnification which is designated by attribute data stored in said input buffer, and said starting point coordinate data and said end point coordinate data, and for outputting coordinates of a starting point and coordinates of an end point, said starting point and end point being in a current pass area; contour reproducing means for outputting punctual coordinates of a contour which are obtained by joining said coordinates of the starting point with coordinates of the end point output from said operation means, using a line the type of which is designated by said line type data; and means for outputting bit data based on said punctual coordinates of the contour.

The starting point coordinate data and end point coordinate data which are read from the contour data storing means are converted by the operation means into new coordinate data in accordance with a required degree of magnification. Among the coordinate data calculated by the operation means, only the data related to the contour in a current printing pass are extracted. The extracted data are converted into dot data. The above process is executed for each printing pass, so that only the coordinate data required for a current printing pass are converted into dot data. Therefore, it is unnecessary to perform a dot conversion for data of an area which is not related to the printing.

BRIEF DESCRIPTION OF THE DRAWINGS

FIG. 1 is a block diagram showing functions of a microcomputer which constitutes a character pattern generation apparatus of the invention;

FIG. 2 is a block diagram showing the configuration of a character pattern generation apparatus for serial printer according to an embodiment of the invention;

FIGS. 6(I), 6(II), and 6(III) are diagrams each showing the relationship between a printing pass and a bit data conversion area.

DETAILED DESCRIPTION OF THE PREFERRED EMBODIMENTS

Figure 3:
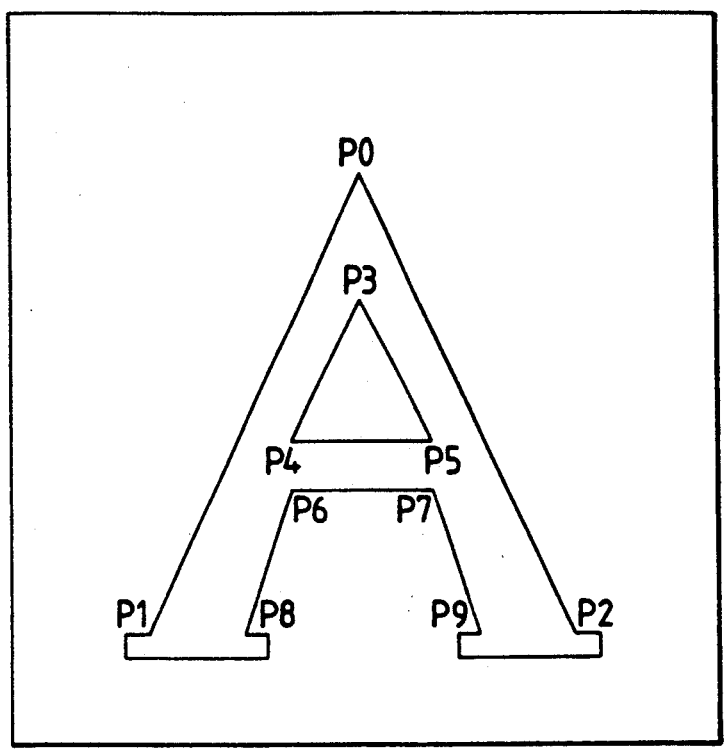
FIG. 3 is a diagram schematically showing an outline font stored in a contour data storing apparatus.

An embodiment of the invention will be described in detail with reference to the accompanying figures.

FIG. 2 shows a character pattern generation apparatus according to an embodiment of the invention. In FIG. 2, the reference numeral 1 denotes a contour data storing device. The contour data storing device 1 stores contour data which represent the contour line of a character or a pattern, correspondingly to a character code. The contour data consist of the number of data, reference points of a plurality of lines, which represent a pattern, i.e., X coordinate values and Y coordinate values of the starting points and the end points, and line type data that specify the type of line joining the starting point and the end point with each other, e.g., a straight line or a parabola.

The reference numeral 3 denotes a microcomputer which constitutes a bit map data generation device. The microcomputer 3 is so programmed as to output bit map data in accordance with a character code and attribute data in an input buffer 2 to a printing buffer 4.

FIG. 1 is a block diagram showing functions to be performed by the above-mentioned microcomputer 3. In FIG. 1, the reference numeral 10 denotes contour data reading means which accesses the contour data storing device 1 based on the character code in the input buffer 2, and outputs contour data. The reference numeral 11 denotes coordinate operation means which, based on a degree of magnification designated by attribute data stored in the input buffer 2 and the reference point coordinate data of the read-out contour data, calculates new reference point coordinate data in accordance with the degree of magnification. The reference numeral 12 denotes segmentation means which sets the coordinates of reference points from the coordinate operation means 11 as coordinates of a starting point and end point, and which calculates, in the contour line of the designated line type and joining the coordinates of these starting point and end point, the coordinates of a starting point and end point that exist in a pass to be printed. The reference numeral 13 denotes contour-in pass reproducing means for outputting to a working memory 14 data of the contour which is obtained by joining the coordinates of the starting point and end point calculated by the segmentation means 12, using the line the type of which is designated by the line type data. The reference numeral 15 denotes bit data conversion means. In this embodiment, the bit data conversion means 15 is so constructed as to represent the contour line calculated by the contour in the pass reproducing means 13, in the form of bits, and to in the sequence of the main scanning direction perform a logical calculation on the bits to generate bit data within the area surrounded by the contour line.

Figure 4:
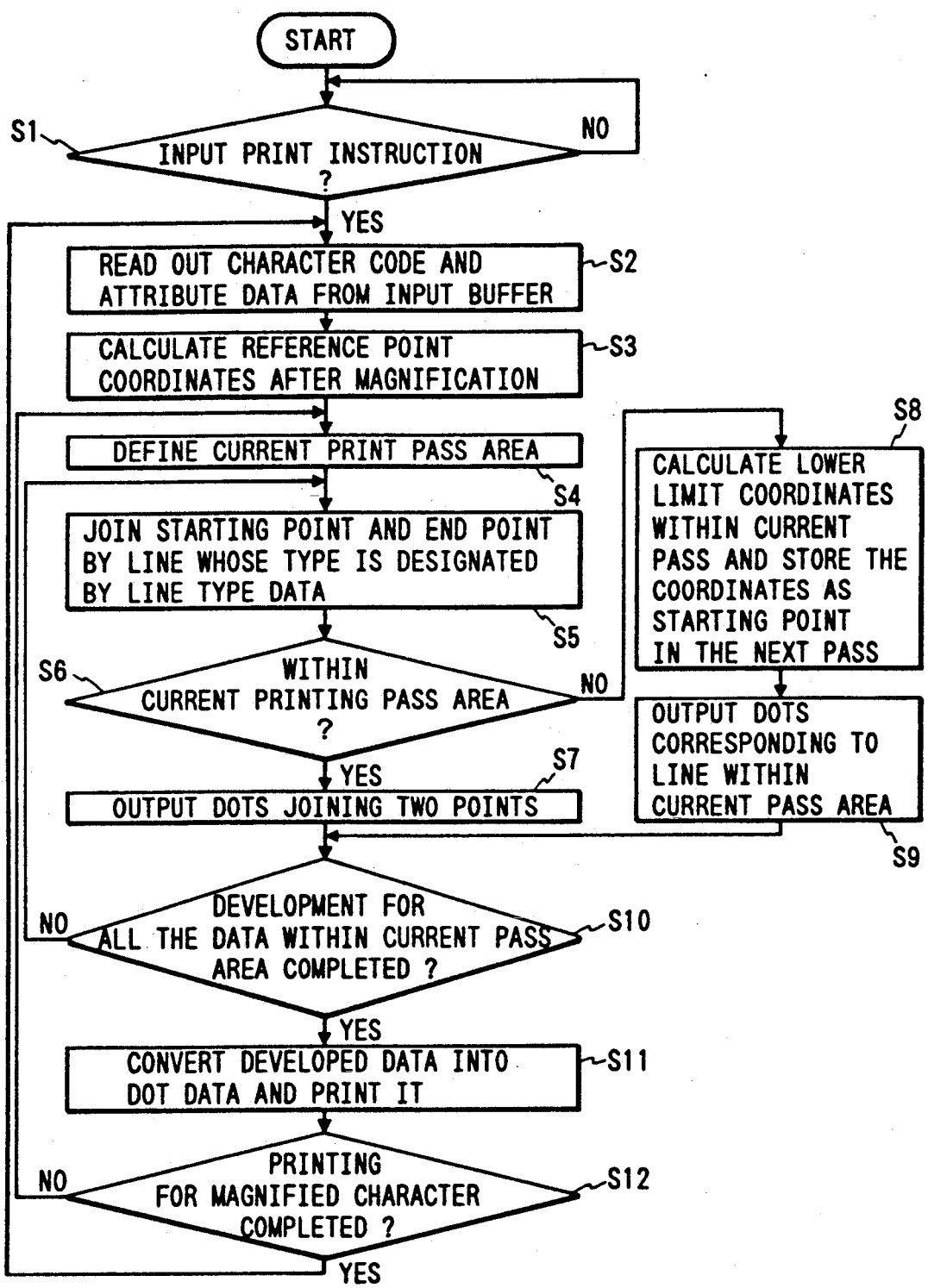
FIG. 4 is a flowchart showing the operation of the embodiment.

The operation of the apparatus thus organized will be described in an exemplary case where bit map data are generated by magnifying outline data shown in FIG. 3 three times, with reference to a flowchart of FIG. 4.

Figure 5:
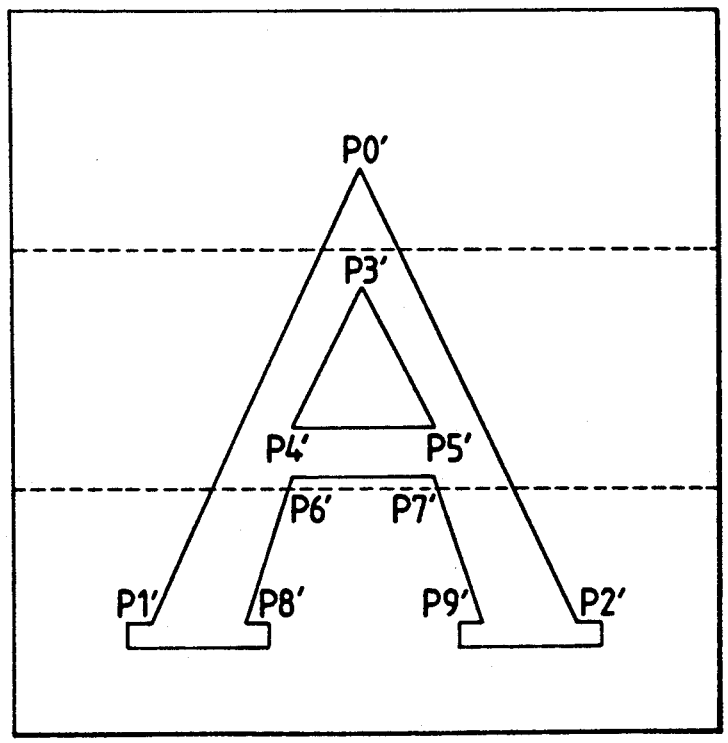
FIG. 5 is a diagram showing coordinates in a case where the outline font stored in the contour data storing apparatus is magnified three times.
Figure 6:
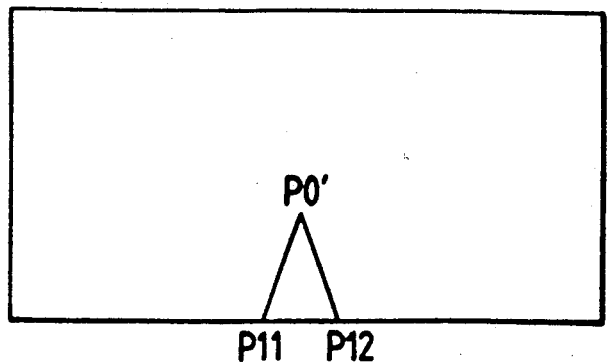
Figure 6:
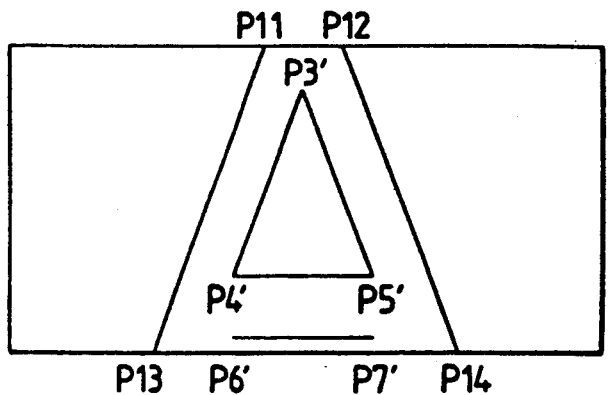
Figure 6:
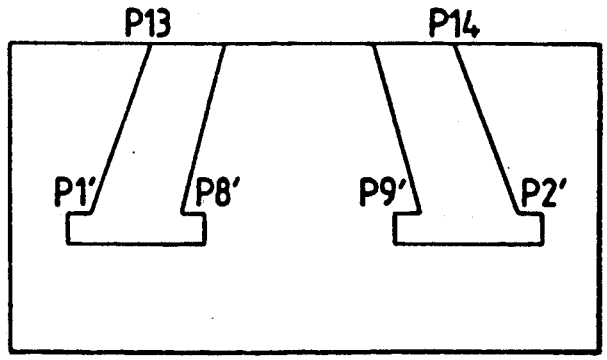

When an instruction to print is input (step S1), the contour data reading means 10 reads a character code stored in the input buffer 2, and magnification data associated with the data, and then reads out contour data corresponding to the character code from the contour data storing device 1 (step S2). The coordinate operation means 11 calculates coordinate values of respective reference points P0', P1', P2', P3' ... Pn' which are obtained by magnifying coordinate values of reference points P0, P1, P2, P3 ... Pn a designated number of times that is designated by attribute data (step S3) (FIG. 5). The segmentation means 12 defines an area which coincides with a current printing pass (step S4) (FIG. 6 (I)). Among the calculated reference points P0', P1', P2', P3' ... Pn', a reference point which serves as a starting point in the defined area shown by FIG. 6(I) is retrieved. The retrieved reference point is joined with a paired reference point which serves as the end point, using a line the type of which is designated by the line type data (in this embodiment, a straight line) (step S5). Specifically, when the reference point P0' is assumed to be a starting point, the reference point P1' is the paired end point. These reference points are joined with each other using a straight line, and it is judged whether the straight line is within the area of the current printing pass shown by FIG. 6(I) or not (step S6). In this example, since a part of the straight line is not within the area of the current pass, a reference point P11 which is the lower limit in the area is calculated (FIG. 6(I)), and the coordinates of the reference point P11 are stored as a starting point in the next pass (step S8). The contour-in pass reproducing means 13 reproduces by dots in the working memory 14 a line which joins the starting point P0, with the calculated reference point P11 (step S9). When an operation for a pair of starting and end points is completed (step S10), the process returns to step S5 where a reference point which is another starting point in the current pass is retrieved. In this example, the reference point P0' serves as a starting point of another contour line which terminates at the reference point P2'. In the same manner as described above, therefore, a lower limit point P12 in the current pass is stored as the starting point of the next printing pass (step S8), and the line in the current pass is reproduced by dots in the working memory 14 (step S9).

It is a matter of course that the process of obtaining a line joining a starting point with an end point is performed only by a numerical calculation. In this stage, therefore, a memory for developing bit data is not required.

When all the dot data for constituting the lines the type of which is designated by the line type data and which joins reference points of starting and end points with each other have been developed in the working memory 14 (step S10), the bit data conversion means 15 performs logical calculations on the data developed in the working memory 14, beginning with the starting address and proceeding in the row direction. In the logical calculations, an exclusive OR operation of the current address and an address proceeding or succeeding the current address is conducted, and the result of this exclusive OR operation is written into the current address, so that data indicative of dots (for example "1") are written only in the area surrounded by the line. When the logical operations are completed, these dot data are output to the printing buffer 4 (step S11). In the same manner as in a usual printing, the dot data in the printing buffer 4 are output to a printing head 5 via a drive circuit (not shown).

For the generation of bits within a region specified by contour data, various methods may be employed. However, it is obvious to those skilled in the art that, even when the contour line is once represented by bit data and then bits are generated by logical operations, a required memory width may be the same as the size of the printing buffer.

When the printing for the first pass is completed (step S12), the segmentation means 12 defines a second printing pass (FIG. 6(II)) (step S4). The reference point of a starting point in the second printing pass is joined with that of a paired end point by a line the type of which is designated by the line type data. In the second printing pass, the reference point P11 which is obtained in the previous calculation serves as an upper limit and starting point, and the reference point P1, serves as an end point. These reference points are joined with each other by a line segment the type of which is designated by the line type data (step S5). Since a part of this joining line is not within the second printing pass area, a lower limit point P13 in the second pass is calculated in the above-mentioned manner, and the coordinates of the point P13 are stored as a starting point in the third printing pass (Fig. 6(III)) (step S8). Then, a line which joins the reference point P11 with the reference point P13 is reproduced by dots in the working memory 14 (step S9).

When an operation for one reference point is completed, a next operation for a reference point P3' which is another starting point is performed. The reference point P3' and a reference point P4' which is an end point paired with the reference point P3' are both in the current pass (step S6), so that the points P3' and P4' are joined with each other by a line the type of which is designated by the line type data. This line is reproduced by dots in the working memory 14. Similarly, a line which joins the reference point P3' with another paired reference point P5' is reproduced by dots in the working memory 14 (step S7).

When operations for all the reference points in the second printing pass are completed in this way, the bit data conversion means 15 converts the data in the working memory 14 into dot data in the above-mentioned manner, and the converted dot data are output to the printing buffer (step S11).

When the printing for the second printing pass is completed (step S12), an area of the third printing pass (FIG. 6(III)) is defined (step S4), and the same operations are executed on reference points P13 and P14 in this area.

When the printing for the character code stored in the input buffer is completed in this way, the host apparatus is requested to output the following data and the process described above is repeated.

For the simplicity of description, the embodiment where a single character code is input in the input buffer has been described. It is obvious to those skilled in the art that, in another case where a plurality of character codes are input in the input buffer, the above-mentioned process is repeated for each of the character codes so that bit data magnified to a degree designated by attribute data can be produced.

In the embodiment, a single developing memory is used. Alternatively, a plurality of developing buffer memories (e.g., two developing buffer memories) may be used. In this case, data for a next pass can be developed into bit map data during a printing process, resulting in the data process speed being improved.

Moreover, in the above-mentioned embodiment, a magnified character is printed using outline font data which are prepared as reference data. It is obvious to those skilled in the art that, even when a reduced character is to be printed using outline font data which are prepared as reference data, the character can be reduced to a desired size by the above-mentioned process.

As described above, according to the invention, the character pattern generation apparatus for a serial printer comprises: contour data storing means for storing contour data representing a contour of a pattern correspondingly to a character code, said contour data including starting point coordinate data, end point coordinate data, and line type data which designates a type of a line joining coordinates indicated by said coordinate data with each other; means for reading said contour data based on a character code stored in an input buffer; operation means for calculating starting point coordinate data and end point coordinate data, based on a degree of magnification which is designated by attribute data stored in said input buffer, and said starting point coordinate data and said end point coordinate data, and for outputting coordinates of a starting point and coordinates of an end point, said starting point and end point being in a current pass area; contour reproducing means for outputting punctual coordinates of a contour which are obtained by joining said coordinates of the starting point which coordinates of the end point output from said operation means, using a line the type of which is designated by said line type data; and means for outputting bit data based on said punctual coordinates of the contour. Therefore, the printing can be performed by performing an operation only for bit data necessary for a single printing pass. This means that, unlike the prior art, the operation of converting coordinate data into bit data which are unnecessary for printing the current pass is not required. According to the invention, therefore, a high-speed printing can be realized and a memory for bit map data conversion can be reduced in size.

What is claimed is:

1. An apparatus for generating a character pattern for a serial printer with which a character pattern is printed in a plurality of printing passes, comprising:

input buffer for storing a character code and attribute data which designates a degree of magnification;

contour data storing means for storing contour data representing a contour of a complete character pattern that extends over a plurality of printing passes and corresponding to said character code, said contour data including starting point coordinate data, end point coordinate data, and line type data which designates a type of a line joining coordinates indicated by said starting and end coordinate data with each other;

means for reading said contour data from said contour data storing means according to said character code stored in said input buffer;

operation means for calculating, at the start of each one of said printing passes, starting point coordinate data and end point coordinate data for a portion of said character pattern to be printed in said one of said printing passes, according to said degree of magnification designated by said attribute data stored in said input buffer, said starting point coordinate data and said end point coordinate data, to output coordinates of a starting point and coordinates of an end point, said starting point and end point being in an area of said one of said printing passes;

contour reproducing means for joining said coordinates of the starting point with said coordinates of the end point output from said operation means by a line the type of which is designated by said line type data, to reproduce punctual coordinates of a contour; and means for converting said punctual coordinates of the contour from said contour reproducing means into bit data to output said converted bit data.

2. An apparatus as claimed in claim 1, wherein said contour reproduces means reproduces said punctual coordinates of a contour by a numerical calculation.

3. An apparatus as claimed in claim 1, further comprising a working memory for developing dot data from said punctual coordinates of the contour output from said contour reproducing means.

4. An apparatus as claimed in claim 3, wherein said converting means performs logical calculations on said dot data developed by said working memory from said coordinates of the starting point in a row direction.

* * * * *